(12) United States Patent
Halsey

(10) Patent No.: US 7,782,007 B2
(45) Date of Patent: Aug. 24, 2010

(54) ELECTRODYNAMIC MACHINE CONTROL

(75) Inventor: David G. Halsey, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 415 days.

(21) Appl. No.: 11/751,736

(22) Filed: May 22, 2007

(65) Prior Publication Data

US 2008/0290764 A1 Nov. 27, 2008

(51) Int. Cl.
*H02P 6/00* (2006.01)

(52) U.S. Cl. ............. 318/701; 318/400.26; 318/400.27; 318/400.28; 318/400.29

(58) Field of Classification Search ................ 318/362, 318/689, 701, 93, 126, 290, 400.01, 400.26, 318/400.27, 400.28, 400.29, 496, 613, 673
See application file for complete search history.

(56) References Cited

U.S. PATENT DOCUMENTS

| | | | |
|---|---|---|---|
| 1,123,321 A | 1/1915 | Lamme | |
| 3,323,032 A | 5/1967 | Agarwal, et al. | |
| 3,643,143 A * | 2/1972 | Rakes | 318/400.09 |
| 3,753,060 A | 8/1973 | Greenwell | |
| 3,956,678 A | 5/1976 | Byrne et al. | |
| 4,234,808 A | 11/1980 | Geppert et al. | |
| 4,528,485 A * | 7/1985 | Boyd, Jr. | 318/400.09 |
| 4,661,756 A | 4/1987 | Murphy et al. | |
| 4,670,696 A | 6/1987 | Byrne et al. | |
| 4,698,537 A | 10/1987 | Byrne et al. | |
| 4,943,760 A | 7/1990 | Byrne et al. | |
| 5,289,107 A * | 2/1994 | Radun et al. | 322/94 |
| 5,404,091 A * | 4/1995 | Radun | 322/94 |
| 5,442,250 A | 8/1995 | Stridsberg | |
| 5,504,410 A * | 4/1996 | Davis | 318/701 |
| 5,652,493 A | 7/1997 | Hendershot, Jr. | |
| 5,672,925 A | 9/1997 | Lipo et al. | |
| 5,689,164 A * | 11/1997 | Hoft et al. | 318/701 |
| 5,705,918 A * | 1/1998 | Davis | 322/94 |
| 5,844,786 A * | 12/1998 | Yoshida et al. | 363/21.01 |
| 5,850,133 A * | 12/1998 | Heglund | 318/700 |
| 5,852,334 A | 12/1998 | Pengov | |
| 5,864,477 A * | 1/1999 | Webster | 363/132 |
| 5,936,373 A | 8/1999 | Li et al. | |
| 6,002,222 A * | 12/1999 | Turner | 318/254.1 |
| 6,034,493 A * | 3/2000 | Boyd et al. | 318/400.31 |
| 6,137,256 A * | 10/2000 | Morris | 318/701 |
| 6,566,841 B2 * | 5/2003 | Sun et al. | 318/771 |
| 6,617,820 B2 | 9/2003 | Carlson et al. | |
| 6,693,403 B2 * | 2/2004 | Chen | 318/701 |
| 6,798,670 B2 * | 9/2004 | King | 363/17 |

(Continued)

FOREIGN PATENT DOCUMENTS

DE 2703791 A1 11/1978

*Primary Examiner*—Bentsu Ro
*Assistant Examiner*—Antony M Paul
(74) *Attorney, Agent, or Firm*—Carlson, Gaskey & Olds PC

(57) ABSTRACT

An electrodynamic machine has a winding and a switching arrangement effectively dividing the winding into individually controllable portions. During a first operating condition, current flows through the entire winding in a manner controlled by the switching arrangement. In a second condition, the switching arrangement restricts current flow to only a portion of the winding. The second condition effectively reduces the inductive capacity of the winding.

18 Claims, 4 Drawing Sheets

U.S. PATENT DOCUMENTS 7,176,650 B2 * 2/2007 Mayes .................. 318/400.04
2005/0073279 A1 4/2005 Fenley 2006/0181238 A1 * 8/2006 Choi et al. .................. 318/786

* cited by examiner

ELECTRODYNAMIC MACHINE CONTROL

BACKGROUND OF THE INVENTION

This invention generally relates to electrodynamic machines such as electric motors or generators. More particularly, this invention relates to power control for such devices.

One type of electrodynamic machine is a traction motor. Traction motors are often required to operate over a very wide speed and torque range. During low speed operation, very large torques may be required to accelerate the load. During high speed operation, lower torque may be required but the load may still require high power.

If the motor is a switched reluctance traction motor built for high torque, low speed operation, it will typically have a large magnetic structure. Such a motor may not be able to fulfill certain high speed operation power requirements because the phase current cannot rise sufficiently rapidly in the large magnetic structure.

It is desirable to be able to use a motor for various conditions. For example, it would be beneficial to facilitate a rapidly rising current in a switched reluctance motor for high speed, high power operation conditions.

SUMMARY OF THE INVENTION

An example, disclosed electrodynamic machine comprises a winding and a switching arrangement associated with the winding. The switching arrangement permits a flow of current through the entire corresponding winding in a first condition, and restricts the flow of current to only a portion of the corresponding winding in a second, different condition.

In one example, the switching arrangement comprises a plurality of switches and at least one coupling with the winding that selectively provides a current path including a portion of the winding and bypassing another portion of the winding.

Permitting current to flow through an entire winding in a first condition and restricting the current to flow through only a portion of the corresponding winding in a second, different condition, effectively varies the inductive capacity of the winding. The varied inductive capacity of the winding facilitates a change in the flow of current. As the portion of the winding through which current flows decreases, the output current is increased.

In another example, the machine comprises a plurality of windings and a corresponding plurality of switching arrangements. Each switching arrangement and associated winding correspond to a different phase of the electrodynamic machine.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
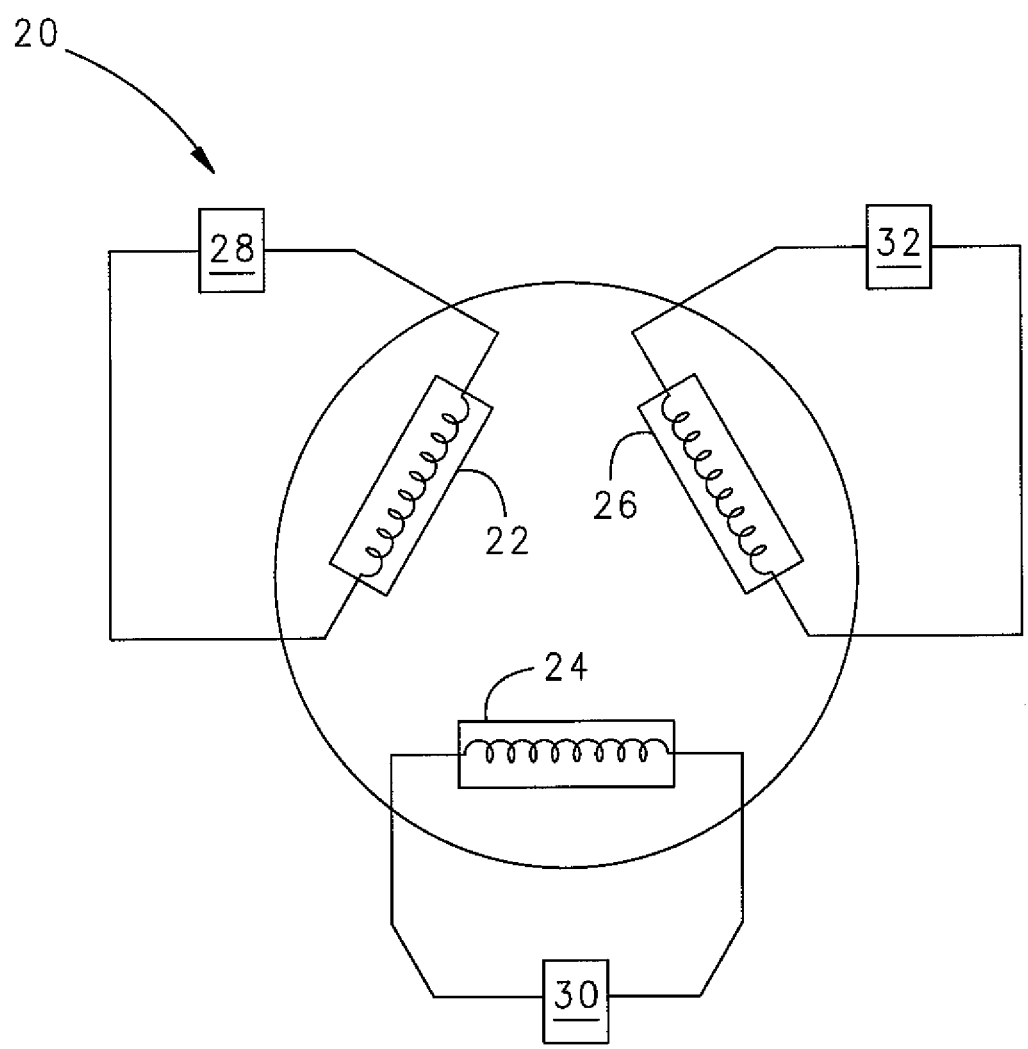
FIG. 1 schematically shows selected portions of an electrodynamic machine.

FIG. 1 is a schematic view of selected portions of an electrodynamic machine 20. In one example, the machine 20 comprises a traction motor. Other motor or generator configurations may be used. A plurality of windings 22, 24 and 26 each have an associated switching arrangement 28, 30 and 32. Each switching arrangement and associated winding corresponds to one phase of the example electrodynamic machine 20.

Figure 2:
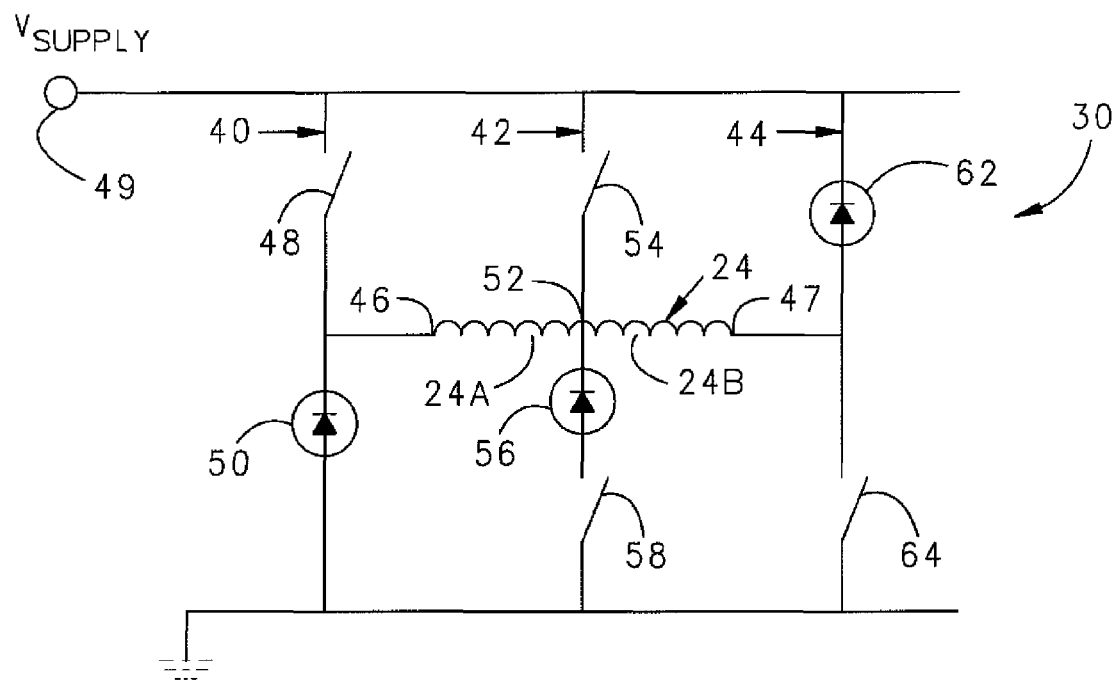
FIG. 2 schematically shows a switching arrangement associated with a single phase of the electrodynamic machine of FIG. 1 in a first operation condition.

FIG. 2 shows one phase of the electrodynamic machine 20 including the winding 24 and the switching arrangement 30. In this example, the switching arrangement 30 comprises a first segment 40, a second segment 42 and a third segment 44. Each segment is wired in parallel to the other segments. The first segment 40 is coupled to one end 46 of the winding 24. The first segment 40 comprises a first portion comprising a switch 48 between the end 46 of the winding 24 and a power supply 49. The first segment 40 has a second portion comprising a diode 50 oriented to allow current to flow only from a ground connection toward the end 46 of the winding 24.

The third segment 44 is coupled to an opposite end 47 of the winding 24. The second segment 42 is electrically coupled across a location 52 of the winding 24 that is between the ends. This coupling location 52 effectively divides the winding 24 into a first portion 24A and a second position 24B on each side of location 52. The example winding is effectively divided into two portions 24A and 24B. The winding 24 is one continuous winding. The portions 24A and 24B need not be two individual windings.

In some examples, the portions 24A and 24B each constitute about one-half of the winding 24. It is possible to use a variety of size relationships between the portions 24A and 24B. Given this description, those skilled in the art will be able to choose the configuration that best suits their particular need.

The second segment 42 comprises a first portion including a switch 54 connected to the winding 24 between the location 52 and the power supply 49. A second portion of the second segment 42 comprises a diode 56 and a switch 58 connected between the location 52 and ground. The diode 56 is oriented to allow current to flow only from ground toward the winding 24 at location 52 on the winding.

The third segment 44, in parallel with the first and second segments 40 and 42, comprises a first portion having a diode 62 oriented to allow current to flow from the end 47 toward the power supply 49. A second portion comprises a switch 64 connected between the end 47 on the 24B side of the winding 24 and ground.

During a first operating condition shown in FIG. 2, which corresponds to at least low speed machine operation in one example, the switches 54 and 58 are kept open and no current flows through the second segment 42. Therefore, the second segment 42 is effectively an open circuit in this first operation condition and has no effect on the performance of the winding 24. In this first operating condition, current flows through the entire winding 24 between the ends 46 and 47. Switches 48 and 64 are used to control the phase current in a known manner to achieve a desired operation of the illustrated phase of the electrodynamic machine 20.

At high speeds, increasing the phase current of the winding 24 in this example is difficult because of the inductive capacity of the winding 24. It will, therefore, be difficult to achieve high power at high speeds in the example machine if only the first condition of the switching arrangement 30 were used. The switching arrangement 30 is useful in a second condition for restricting the current to flow through only a portion of the winding 24 (e.g., only the portion 24A or 24B) effectively reducing the inductive capacity of the winding, which allows for delivering high power even at high speeds.

Figure 3:
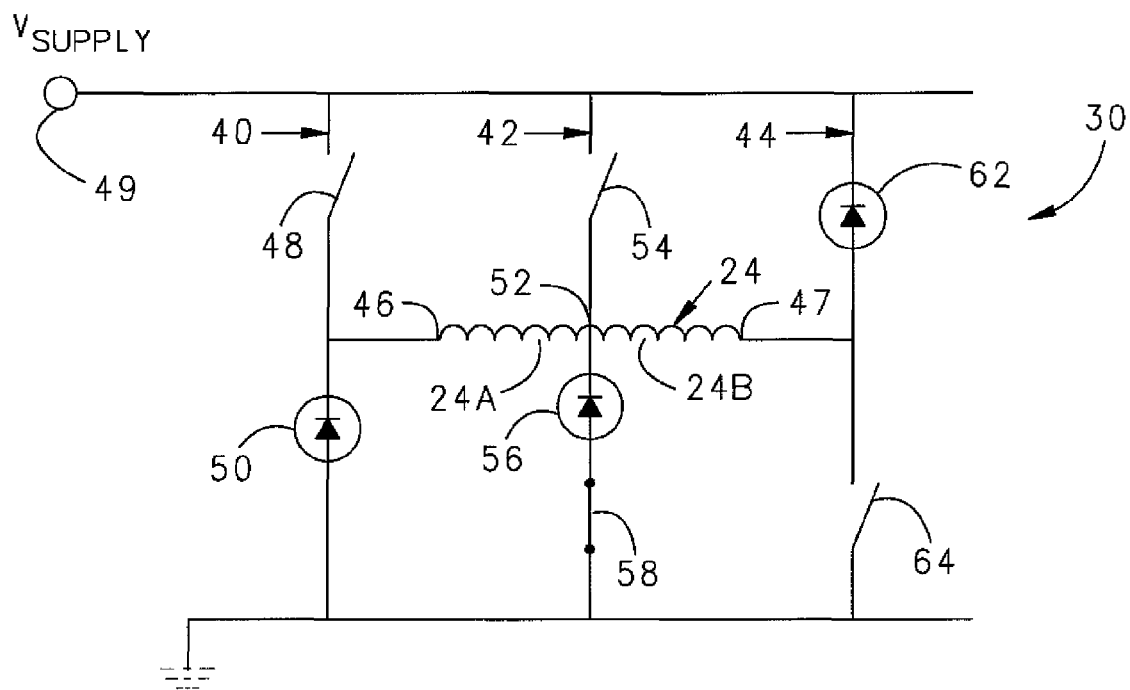
FIG. 3 schematically shows the example of FIG. 2 in a second operating condition.

An example second operating condition useful for high speed, high power machine operation is shown in FIG. 3. In this example, current flows through only the portion 24B of the winding 24 from the location 52 to the end 47. Switch 48 is kept open so that no current flows through the first segment 40. Switch 58 is kept closed. The open switch 48 and the diodes 50 and 56 ensure that no current flows through the 24A portion of the winding 24. By restricting a flow of current to only the second portion 24B of the winding (e.g., bypassing the portion 24A), the inductive capacity of the winding 24 in this operating condition is effectively reduced and the overall phase current is increased. The higher phase current enables the electrodynamic machine to deliver higher power as needed. The switches 54 and 64 are controlled in a known manner to achieve a desired phase current in the portion 24B while operating in the second condition.

Figure 4:
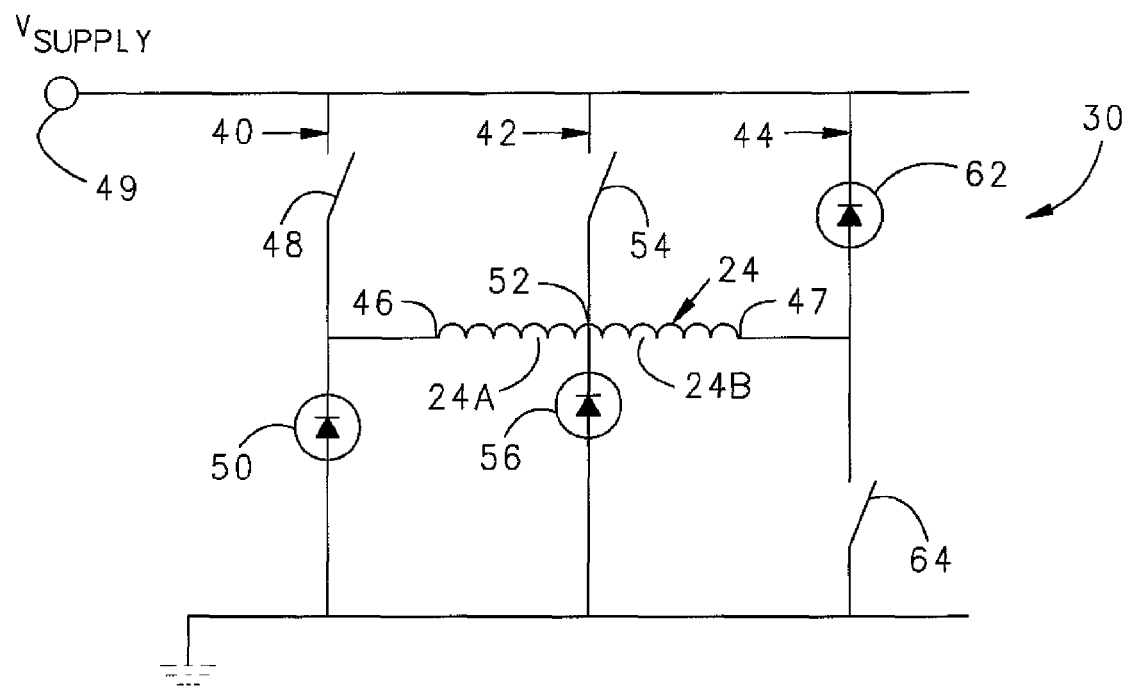
FIG. 4 schematically shows another example embodiment.

In another example shown in FIG. 4, the switch 58 is not included. This particular embodiment allows for soft-chopping in a second operating condition using the switches 54 and 64 and known techniques.

In another example, the switching arrangement 30 comprises at least one more segment and the winding 24 is subdivided into at least three portions. This would enable the delivery of even more current, because the inductive capacity of the winding could be further restricted to only flow through an even smaller portion of the winding. In some examples, the winding is divided into four or more segments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An electrodynamic machine, comprising:
   a winding; and
   a switching arrangement associated with the winding, wherein the switching arrangement permits a flow of current through at least a first portion of the winding in a first condition and restricts a flow of current to only a second, smaller portion of the winding in a second, different condition wherein the switching arrangement comprises:
   a first segment, comprising
      a first portion having a first switch connected to one end of the winding, the first switch being selectively closed in the first condition and kept open in the second condition; and
      a second portion allowing current to flow in only one direction toward the winding;
   a second segment, in parallel with the first segment, comprising
      a first portion having a second switch connected to the winding, at a location between ends of the winding; and
      a second portion allowing current to flow in only one direction toward the winding;
   a third segment, in parallel with the first and second segments, comprising
      a first portion connected to an opposite end of the winding, allowing current to flow only away from the winding; and
      a second portion comprising a third switch connected to the opposite end of the winding.

2. The machine of claim 1, comprising a plurality of windings and a corresponding plurality of switching arrangements.

3. The machine of claim 1, wherein the switching arrangement comprises a plurality of switches and at least one coupling that provides a current path for including the second portion of the winding and bypassing another portion of the winding.

4. The machine of claim 3, wherein the switching arrangement comprises a plurality of selectively controlled switches permitting or restricting flow of current in the first and second conditions, respectively.

5. The machine of claim 4, wherein the switching arrangement comprises a plurality of diodes for selectively controlling the flow of current through the winding and the switching arrangement.

6. The machine of claim 3, wherein the at least one coupling is connected to the winding at a location between ends of the winding.

7. The machine of claim 1, wherein the second portion of the second segment comprises a switch.

8. The machine of claim 1, wherein the second portion of the first segment, the second portion of the second segment, and the first portion of the third segment each comprise at least one diode oriented to allow current to flow in one direction.

9. The machine of claim 1, wherein the first condition corresponds to low speed machine operation.

10. The machine of claim 1, wherein the second condition corresponds to high speed machine operation.

11. The machine of claim 1, wherein the switching arrangement comprises a coupling to the winding at a location on the winding between opposite ends of the winding and wherein the second, smaller portion of the winding is between the coupling and one of the ends of the winding.

12. A method of controlling an electrodynamic machine comprising:
   permitting current from a source distinct from a winding to flow through the entire winding in a first condition;
   restricting current from the source to flow through only a portion of the winding in a second, different condition; and
   using a switching arrangement for performing the permitting and restricting wherein the switching arrangement comprises:
   a first segment, comprising
      a first portion having a first switch connected to one end of the winding, the first switch being selectively closed in the first condition and kept open in the second condition; and
      a second portion allowing current to flow in only one direction toward the winding;
   a second segment, in parallel with the first segment, comprising
      a first portion having a second switch connected to the winding, at a location between ends of the winding; and
      a second portion allowing current to flow in only one direction toward the winding;
   a third segment, in parallel with the first and second segments, comprising
      a first portion connected to an opposite end of the winding, allowing current to flow only away from the winding; and a second portion comprising a third switch connected to the opposite end of the winding.

13. The method of claim 12, comprising restricting current to flow through only a portion of a plurality of windings, simultaneously.

14. The method of claim 12, comprising selectively controlling a plurality of switches in a switching arrangement in order to permit or restrict the flow of current in the first and second conditions respectively.

15. The method of claim 12, comprising permitting the flow of current to flow through the entire winding during low speed machine operation.

16. The method of claim 12, comprising restricting the flow of current to flow through only a portion of the winding during high speed machine operation.

17. The method of claim 12, comprising coupling a switching arrangement to a location of the winding between opposite ends of the winding; and
    wherein the portion of the winding is between the coupling and one of the ends of the winding.

18. A method of controlling an electrodynamic machine, comprising:
    permitting current to flow through an entire winding to realize a first inductive capacity of the winding and a first phase current; and
    restricting current to flow through only a portion of the winding to realize a second, reduced inductive capacity of the winding and a second, increased phase current;
    coupling a switching arrangement to the winding at a location between opposite ends of the winding and wherein the portion of the winding is between the coupling and one of the ends wherein the switching arrangement comprises:
    a first segment, comprising
        a first portion having a first switch connected to one end of the winding, the first switch being selectively closed in the first condition and kept open in the second condition; and
        a second portion allowing current to flow in only one direction toward the winding;
    a second segment, in parallel with the first segment, comprising
        a first portion having a second switch connected to the winding, at a location between ends of the winding; and
        a second portion allowing current to flow in only one direction toward the winding;
    a third segment, in parallel with the first and second segments, comprising
        a first portion connected to an opposite end of the winding, allowing current to flow only away from the winding; and
    a second portion comprising a third switch connected to the opposite end of the winding.

* * * * *